United States Patent
Yamamoto et al.

(10) Patent No.: US 10,315,594 B2
(45) Date of Patent: Jun. 11, 2019

(54) SLIDE WIRING APPARATUS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Satoshi Yamamoto, Yokkaichi (JP); Hiroki Hirai, Yokkaichi (JP); Makoto Higashikozono, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/063,464

(22) PCT Filed: Dec. 12, 2016

(86) PCT No.: PCT/JP2016/086948
§ 371 (c)(1),
(2) Date: Jun. 18, 2018

(87) PCT Pub. No.: WO2017/110566
PCT Pub. Date: Jun. 29, 2017

(65) Prior Publication Data
US 2018/0361960 A1    Dec. 20, 2018

(30) Foreign Application Priority Data
Dec. 22, 2015   (JP) ................. 2015-250396

(51) Int. Cl.
H02G 11/00    (2006.01)
B60R 16/02    (2006.01)
(Continued)

(52) U.S. Cl.
CPC ........ B60R 16/0215 (2013.01); B60N 2/0722 (2013.01); B60N 2/90 (2018.02);
(Continued)

(58) Field of Classification Search
CPC combination set(s) only.
See application file for complete search history.

(56) References Cited

U.S. PATENT DOCUMENTS 7,151,224 B2 * 12/2006 Kogure ............... B60R 16/0215
                                                                  174/72 A
7,425,143 B2 *  9/2008 Mitsui .................. H01R 35/025
                                                                  242/388
(Continued)

FOREIGN PATENT DOCUMENTS

JP        2014015108 A      1/2014

OTHER PUBLICATIONS

International Search Report for Application No. PCT/JP2016/086948 dated Jan. 31, 2017; 4 pages.

*Primary Examiner* — William H. Mayo, III
*Assistant Examiner* — Krystal Robinson
(74) *Attorney, Agent, or Firm* — Reising Ethington, P.C.

(57) ABSTRACT

A slide wiring apparatus configured to electrically connect a vehicle body and a sliding member that is provided in the vehicle body. The slide wiring apparatus includes a support rail, a slider configured to slidably support the sliding member, a wire harness that is disposed inside the support rail and is drawn out of the support rail from an opening portion of the support rail, a guide portion configured to fold, toward the support rail, an extra length portion of the wire (Continued)

harness that is drawn out from the opening portion of the support rail, an accommodation portion for accommodating the extra length portion of the wire harness in a state in which the extra length portion is folded in a U-shape, and an external member that is bendable in only one direction.

4 Claims, 7 Drawing Sheets

(51) Int. Cl.
*B60N 2/90* (2018.01)
*B60N 2/07* (2006.01)
*B60R 16/03* (2006.01)
*B60R 16/037* (2006.01)
*H02G 3/04* (2006.01)
*B60R 16/027* (2006.01)

(52) U.S. Cl.
CPC ............ *B60R 16/027* (2013.01); *B60R 16/03* (2013.01); *B60R 16/037* (2013.01); *H02G 3/0475* (2013.01); *H02G 11/00* (2013.01)

(56) References Cited

U.S. PATENT DOCUMENTS

| | | | |
|---|---|---|---|
| 9,573,536 B2* | 2/2017 | Katou | B60N 2/06 |
| 9,581,270 B2* | 2/2017 | Peterson | H02G 3/0487 |
| 9,701,261 B2* | 7/2017 | Katsuramaki | H02G 11/02 |
| 2001/0052203 A1* | 12/2001 | Doshita | B60R 16/0215 49/502 |
| 2001/0052442 A1* | 12/2001 | Tsukamoto | B60R 16/0215 191/12 R |
| 2003/0121692 A1* | 7/2003 | Kato | B60R 16/0215 174/68.1 |
| 2003/0222183 A1* | 12/2003 | Kato | B60R 16/0215 248/49 |
| 2005/0092511 A1* | 5/2005 | Sekino | B60R 16/0215 174/72 A |
| 2011/0267798 A1* | 11/2011 | Nakazaki | H01B 7/0892 361/827 |
| 2014/0332265 A1* | 11/2014 | Nagayasu | H02G 3/0691 174/72 A |
| 2014/0339376 A1* | 11/2014 | Katou | B60R 16/027 248/49 |
| 2015/0360629 A1* | 12/2015 | Sekino | B60R 16/0215 174/68.3 |
| 2018/0278036 A1* | 9/2018 | Kuboki | B60R 16/0215 |

* cited by examiner

SLIDE WIRING APPARATUS

CROSS REFERENCE TO RELATED APPLICATIONS

This application claims the priority of Japanese patent application JP2015-250396 filed on Dec. 22, 2015, the entire contents of which are incorporated herein.

TECHNICAL FIELD

The present disclosure relates to a slide wiring apparatus.

BACKGROUND ART

Conventionally, a vehicle such as an automobile is provided with a sliding member such as a sliding seat that is slidably installed in a vehicle body. For example, the sliding member is slidably supported by a support rail fixed to the vehicle body via a slider, and is installed to perform a sliding movement on the rail along the support rail. In a sliding seat, the support rail is fixed to the floor of the vehicle body along a front-rear direction, and the sliding seat (sliding member) is moveable in the front-rear direction with respect to the vehicle body. Also, various electric components are attached to the sliding seat, such as an electromotive slide apparatus or an electromotive reclining apparatus that is provided with a motor, a heater, a belt mounting sensor for detecting that a seat belt is worn, and a seating sensor for detecting that an occupant has a seat, for example. Thus, in order to electrically connect an electric component such as a battery or an ECU that is provided in the vehicle body of an automobile including a sliding seat and an electric component provided in the sliding seat, a slide wiring apparatus for routing a wire harness in the sliding seat is utilized for the automobile including the sliding seat (see Patent Documents 1 (JP2012-45994A) and 2 (JP2013-42658A)).

Patent Documents 1 and 2 disclose a slide wiring apparatus including a support rail fixed to a vehicle body, a slider that is slidably attached to the support rail and is configured to support a sliding member (sliding seat), and a wire harness disposed inside a support rail. In this slide wiring apparatus, one end of the wire harness is linked to the slider and this end is connected to the sliding member, and the other end of the wire harness is drawn out of the support rail from an opening portion provided at one end of the support rail. Also, the slide wiring apparatus includes an accommodation portion for accommodating an extra length portion of the wire harness that is drawn out from the opening portion of the support rail in a state in which the extra length portion is folded in a U-shape, and a guide portion configured to guide the extra length portion of the wire harness to the accommodation portion from the opening portion of the support rail. A corrugated tube is wrapped around the wire harness.

In the above-described slide wiring apparatus, the wire harness moves in the support rail as the sliding member (slider) moves. Specifically, when the sliding member moves toward one end of the support rail, the wire harness in the support rail is pushed out from the opening portion of the support rail, and the extra length portion of the wire harness is pushed into the accommodation portion through the guide portion. On the other hand, when the sliding member moves toward the other end of the support rail, the extra length portion of the wire harness is drawn out from the accommodation portion, and the wire harness is drawn into the support rail from the opening portion of the support rail through the guide portion. Accordingly, it is possible to route a wire harness following the slide movement of the sliding member and to provide an electrical connection between the vehicle body and the sliding member.

SUMMARY

A slide wiring apparatus of this disclosure is a slide wiring apparatus configured to electrically connect a vehicle body and a sliding member that is slidably provided in the vehicle body, the slide wiring apparatus including:

a support rail that is fixed to the vehicle body and is provided with a slit extending in a longitudinal direction;

a slider that is slidably attached to the support rail, is exposed from the slit, and is configured to support the sliding member;

a wire harness that is disposed inside the support rail, has one end that is connected to the sliding member, and has another end that is drawn out of the support rail from an opening portion provided at one end of the support rail;

a guide portion that is connected to the opening portion of the support rail, and is configured to bend and fold, toward the support rail, an extra length portion of the wire harness that is drawn out from the opening portion;

an accommodation portion for accommodating the extra length portion of the wire harness passing through the guide portion in a state in which the extra length portion is folded in a U-shape, the accommodation portion being disposed on the side of the support rail and being connected to the guide portion; and an external member that has one end linked to the slider, is wrapped around the wire harness from its one end to the extra length portion at the other end, and is bendable in only one direction, in which the extra length portion of the wire harness has a linear portion that linearly extends from the guide portion toward the accommodation portion, and a folded portion that is folded on the side opposite to the guide portion side, the end portion of the guide portion on the accommodation portion side has a first guide wall that extends toward the accommodation portion and slides against the external member of the wire harness, and a side wall of the accommodation portion that faces the linear portion of the wire harness is provided with a step portion that forms a step with the first guide wall and does not slide against the external member of the wire harness.

DESCRIPTION OF EMBODIMENTS

Figure 1:
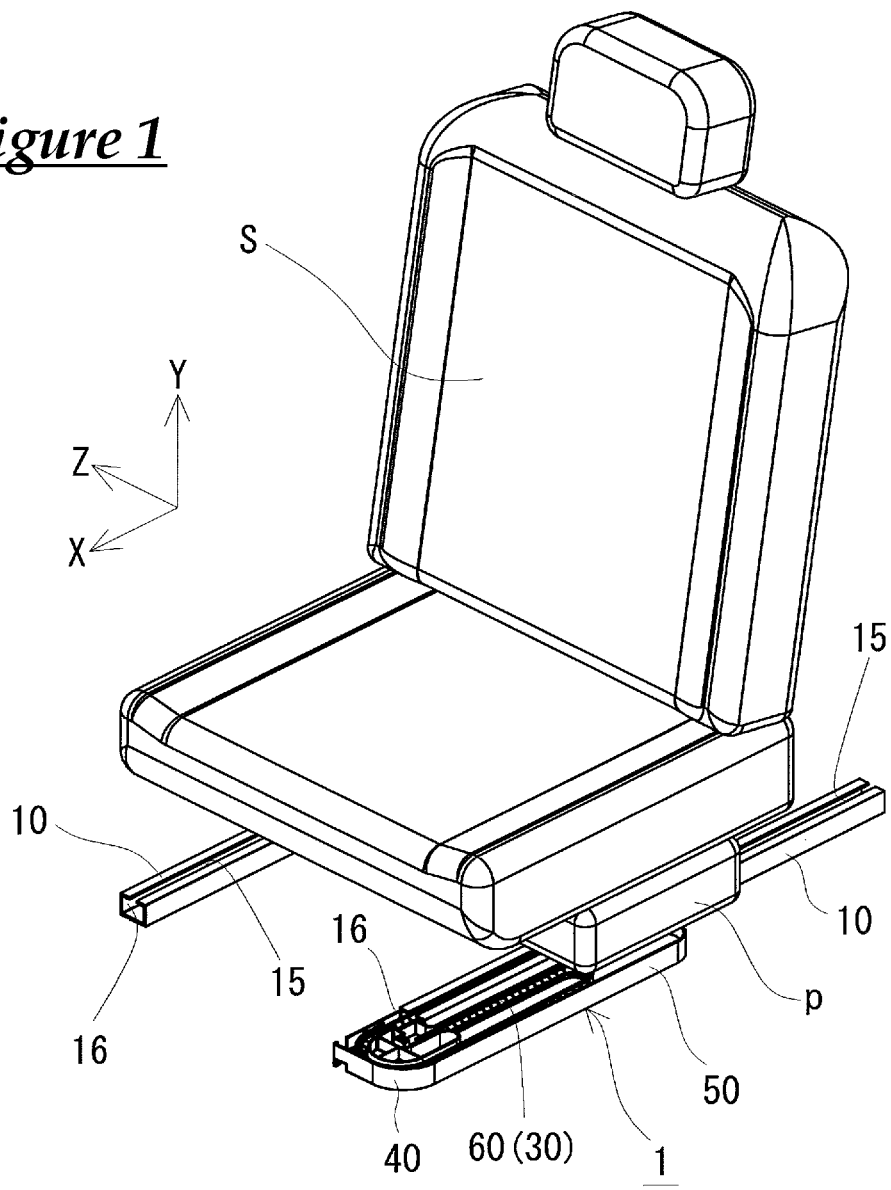
FIG. 1 is a schematic perspective view showing a configuration example of a slide wiring apparatus according to Embodiment 1.

In a slide wiring apparatus, it is desired to reduce a frictional resistance when a wire harness moves following the slide movement of a sliding member, reduce a load applied to slide the sliding member (slide operation load), and suppress the production of irritating noise during the slide movement.

In a conventional slide wiring apparatus, an opening portion of a guide portion that is connected to an accommodation portion is provided along a side wall of the accommodation portion. Thus, an extra length portion of the wire harness is drawn out from the accommodation portion following the slide movement of the sliding member, or when the extra length portion is pushed therein, the extra length portion of the wire harness moves while sliding against the side wall of the accommodation portion. Thus, friction occurs between the extra length portion and the side wall of the accommodation portion when the extra length portion of the wire harness moves inside the accommodation portion, and thus there is a concern that a load applied to slide the sliding member will increase or irritating noise will be produced during the slide movement. In particular, if the extra length portion of the wire harness is folded in a U-shape and is accommodated in the accommodation portion, the extra length portion is sometimes pressed against the side wall of the accommodation portion due to an elastic restoring force of the wire harness, and a frictional resistance increases. Thus, an increase in the slide operation load caused by friction between the extra length portion of the wire harness and the side wall of the accommodation portion, or the production of irritating noise during the slide movement tends to be problematic.

Also, in a conventional slide wiring apparatus, a corrugated tube is adopted as an external member of a wire harness. Because the corrugated tube is bendable in any direction, the effect of preventing the extra length portion of the wire harness from bulging outward due to an elastic restoring force in an accommodation portion cannot be attained. Thus, the extra length portion is pressed against the side wall of the accommodation portion, and thus a frictional resistance increases.

In view of this, an object of this disclosure is to provide a slide wiring apparatus with which a load applied to slide a sliding member can be reduced and the production of irritating noise during the slide movement can be suppressed.

A slide wiring apparatus of this disclosure is capable of reducing a load applied to slide a sliding member and suppressing the production of irritating noise during the slide movement.

First, embodiments of the present disclosure will be described.

A slide wiring apparatus according to an aspect of the present disclosure is a slide wiring apparatus configured to electrically connect a vehicle body and a sliding member that is slidably provided in the vehicle body, the slide wiring apparatus including:

a support rail that is fixed to the vehicle body and is provided with a slit extending in a longitudinal direction;

a slider that is slidably attached to the support rail, is exposed from the slit, and is configured to support the sliding member;

a wire harness that is disposed in the support rail, has one end that is connected to the sliding member, and has another end that is drawn out of the support rail from an opening portion provided at one end of the support rail;

a guide portion that is connected to the opening portion of the support rail, and is configured to bend and fold, toward the support rail, an extra length portion of the wire harness that is drawn out from the opening portion;

an accommodation portion for accommodating the extra length portion of the wire harness passing through the guide portion in a state in which the extra length portion is folded in a U-shape, the accommodation portion being disposed on the side of the support rail and being connected to the guide portion; and an external member that has one end linked to the slider, is wrapped around the wire harness from its one end to the extra length portion at the other end, and is bendable in only one direction, in which the extra length portion of the wire harness has a linear portion that linearly extends from the guide portion toward the accommodation portion, and a folded portion that is folded on the side opposite to the guide portion side, the end portion of the guide portion on the accommodation portion side has a first guide wall that extends toward the accommodation portion and slides against the external member of the wire harness, and a side wall of the accommodation portion that faces the linear portion of the wire harness is provided with a step portion that forms a step with the first guide wall and does not slide against the external member of the wire harness.

According to the above-described slide wiring apparatus, the external member that is bendable in only one direction is wrapped around the wire harness, and the direction in which the wire harness bends is restricted to one direction. Thus, in the accommodation portion, the extra length portion of the wire harness that extends from the guide portion toward the accommodation portion has linearity, and a linear portion of the extra length portion is kept in a linear state. Also, the end portion of the guide portion on the accommodation portion side is provided with the first guide wall extending toward the accommodation portion, and the side wall of the accommodation portion that faces the linear portion of the wire harness is provided with the step portion that forms a step with the first guide wall. In the accommodation portion, the external member in the linear portion of the wire harness is located apart from the side wall of the accommodation portion due to this step portion. Therefore, when the extra length portion of the wire harness follows the slide movement of the sliding member and moves inside the accommodation portion, it is possible to prevent the external member in the linear portion of the wire harness from sliding against the side wall of the accommodation portion over its full length. Thus, it is possible to reduce frictional resistance caused by the external member in the extra length portion of the wire harness sliding against the side wall of the accommodation portion, reduce a load applied to slide the sliding member, and to suppress production of irritating noise during the slide movement.

According to one aspect of the above-described slide wiring apparatus, the first guide wall may be inclined away from the side wall of the accommodation portion from the guide portion toward the accommodation portion.

Because the first guide wall is inclined away from the side wall of the accommodation portion, the external member in the linear portion of the wire harness is more unlikely to slide against the side wall of the accommodation portion. There is a possibility to further reduce frictional resistance when the extra length portion of the wire harness moves inside the accommodation portion.

According to one aspect of the above-described slide wiring apparatus, the external member may be constituted by linking a plurality of tubular pieces that cover the wire harness in series, and portions of the adjacent tubular pieces that are located on a radially inner side when the external member is bent may be joined by hinges.

Because the external member is constituted by linking the plurality of tubular pieces and portions of adjacent tubular pieces that are located on the radially inner side are joined by hinges, the wire harness is bendable in only one direction.

According to one aspect of the above-described slide wiring apparatus, the end portion of the guide portion on the support rail side may have a second guide wall that extends toward the opening portion of the support rail and slides against the external member of the wire harness, and the second guide wall may be located inward of the side wall of the support rail in a width direction of the support rail.

The end portion of the guide portion on the support rail side is provided with the second guide wall extending toward the opening portion of the support rail, and the second guide wall is located inward of the side wall of the support rail. In the wire harness in the support rail, the external member is located apart from the side wall of the support rail due to this second guide wall. Thus, it is possible to prevent the external member from sliding against the side wall of the support rail when the wire harness in the support rail moves following the slide movement of the sliding member. Thus, it is possible to reduce frictional resistance caused by the external member in the wire harness in the support rail sliding against the side wall of the support rail, and therefore, to further reduce a load applied to slide the sliding member, and to further suppress production of irritating noise during the slide movement.

According to one aspect of the above-described slide wiring apparatus, the wire harness may be arranged on one side in a width direction of the support rail, with respect to the slit in the support rail, and an upper wall of the external member located on the slit side may have an inclined surface that downwardly inclines toward a center in the width direction of the support rail.

There is a concern that foreign matter will enter from the slit of the support rail toward the inside, be pressed against the upper wall of the external member, impair the external member, and scratch the wire harness in the support rail. The orientation of foreign matter can be changed along the inclined surface due to the inclined surface provided on the upper wall of the external member, and impairment of the external member by foreign matter can be easily avoided. Also, in the case of the above-described configuration in which the end portion of the guide portion on the support rail side has the second guide wall, the external member is located apart from the side wall of the support rail, and thus, this space can be utilized as a space for retracting the external member. Specifically, when foreign matter is pressed against the inclined surface of the upper wall of the external member, the external member can retract toward the side wall of the support rail, and impairment of the external member can be avoided.

Specific examples of a slide wiring apparatus according to an embodiment of the present disclosure will be described with reference to the following drawings. The same reference numerals in the drawings indicate constituent elements with the same name. Note that the present invention is not merely limited to these examples, and the present invention is defined by the scope of the appended claims and all changes that fall within the same essential spirit as the scope of the claims are included therein.

Embodiment 1

A slide wiring apparatus 1 according to Embodiment 1 will be described with reference to FIGS. 1 to 7. The slide wiring apparatus 1 of Embodiment 1 is an example in which the present invention is applied to a sliding seat provided in a vehicle.

Figure 2:
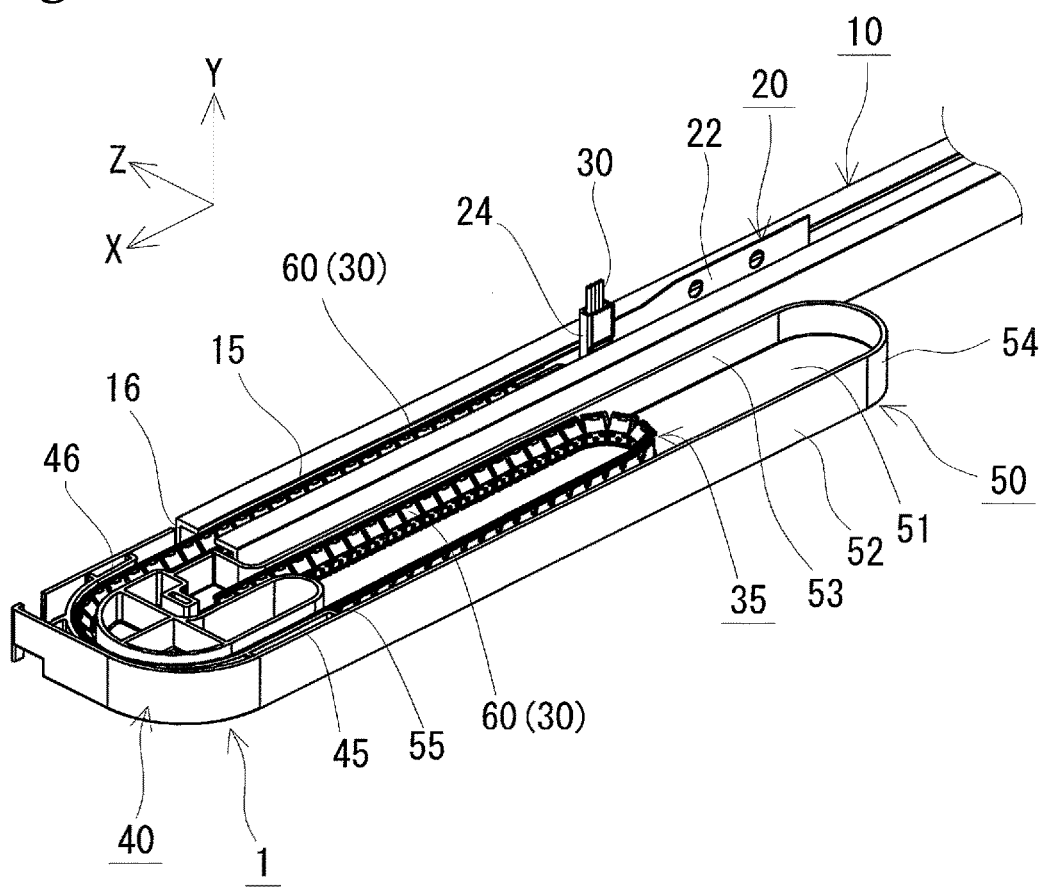
FIG. 2 is a schematic perspective view of an enlarged portion of the slide wiring apparatus according to Embodiment 1.
Figure 3:
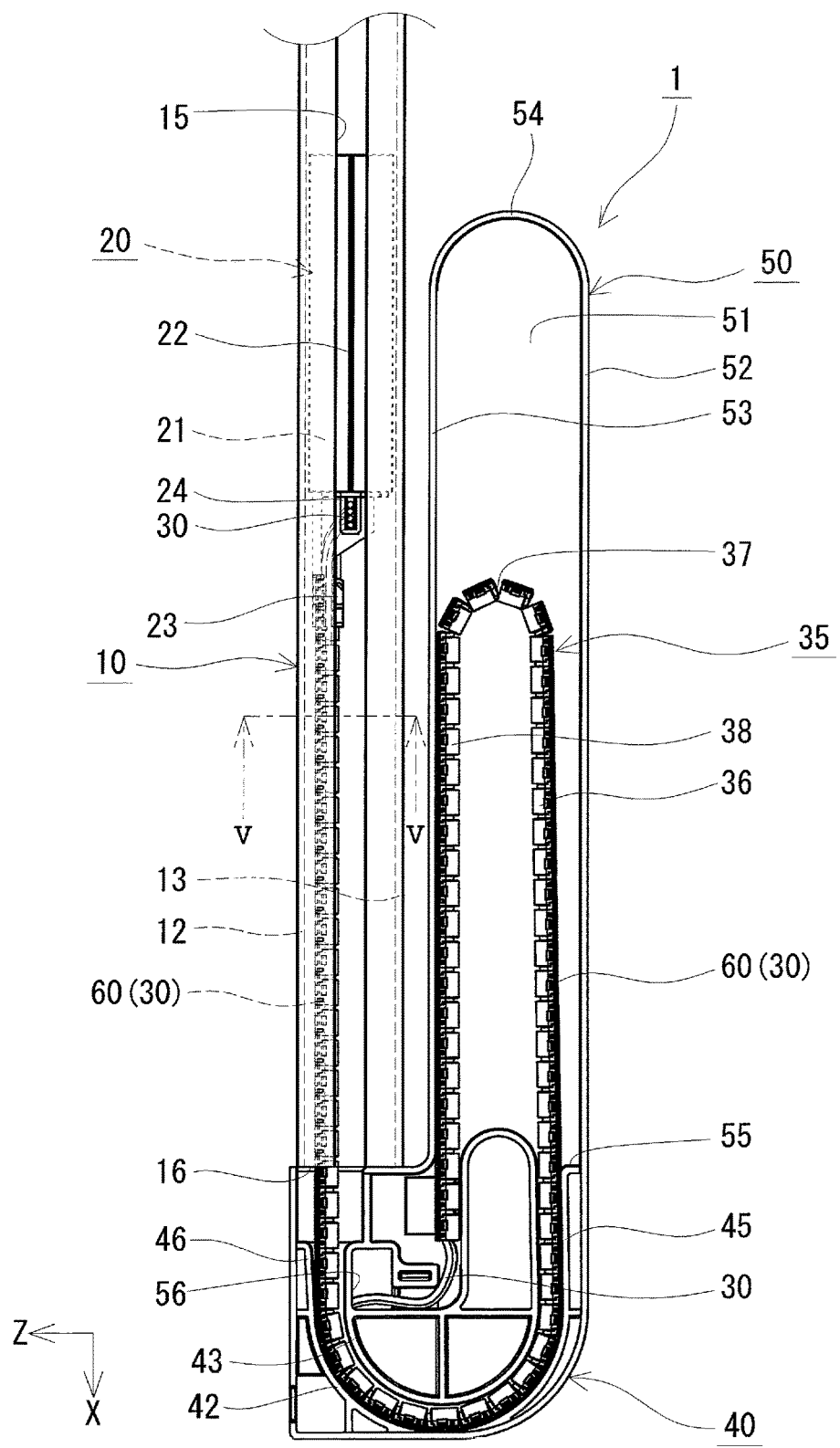
FIG. 3 is a schematic top view of an enlarged portion of the slide wiring apparatus according to Embodiment 1.
Figure 4:
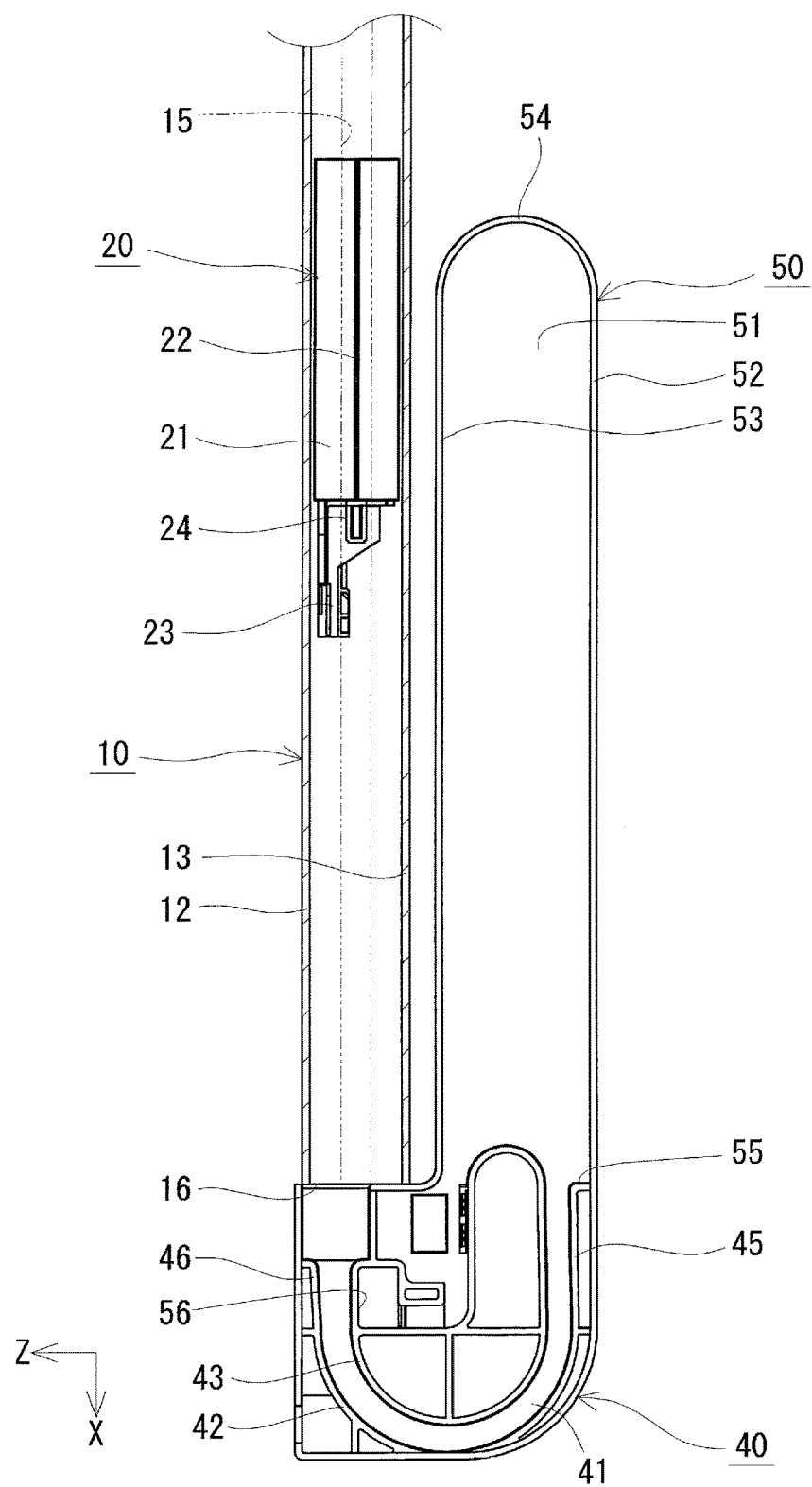
FIG. 4 is a schematic top view of an enlarged portion of the slide wiring apparatus according to Embodiment 1.

The slide wiring apparatus 1 is for electrically connecting a vehicle body (not shown) of a vehicle and a sliding seat (sliding member) S that is provided slidably in the vehicle body. As shown in FIGS. 1 to 4, the slide wiring apparatus 1 includes support rails 10, a slider 20, a wire harness 30, a guide portion 40, an accommodation portion 50, and an external member 60. For facilitating the description, FIG. 4 shows a cross section of the support rail 10, and the wire harness 30 (external member 60) is omitted. One of the features of this slide wiring apparatus 1 is that the external member 60, which is bendable in only one direction, is wrapped around the wire harness 30 (see FIGS. 5 and 6). Also, another feature is that an end portion of the guide portion 40 on the accommodation portion side is provided with a first guide wall 45, and an outer wall 52 of the accommodation portion 50 is provided with a step portion 55 that forms a step with the first guide wall (see FIGS. 3 and 4). Hereinafter, a configuration of the slide wiring apparatus 1 will be described in detail. In the following description, "front" (X direction in the drawings) refers to the one end side of the support rail 10, "rear" refers to the other end side, "top" (Y direction in the drawings) refers to the side on which a slit 15 is formed, "bottom" refers to the opposite side, "left" (Z direction in the drawings) refers to the left side viewed from the one end side of the support rail 10, and "right" refers to the right side.

A sliding seat S is installed to move slidingly on the support rail 10 along the longitudinal direction of the support rail 10, which will be described later. The sliding seat S is equipped with various electric components (not shown) such as an electromotive slide apparatus, an electromotive reclining apparatus, a heater, a belt mounting sensor, and a seating sensor.

The slide wiring apparatus 1 includes a pair of left and right support rails 10, and the support rails 10 are disposed on the floor of the vehicle body in parallel to each other along the front-rear direction. As shown in FIGS. 1 and 2, an upper wall of the support rail 10 is provided with a slit 15 extending in the longitudinal direction over the full length. As shown in FIGS. 3 and 4, the slit 15 is formed at the center in the width direction of the support rail 10. One end of the support rail 10 is open, and is provided with an opening portion 16.

Figure 5:
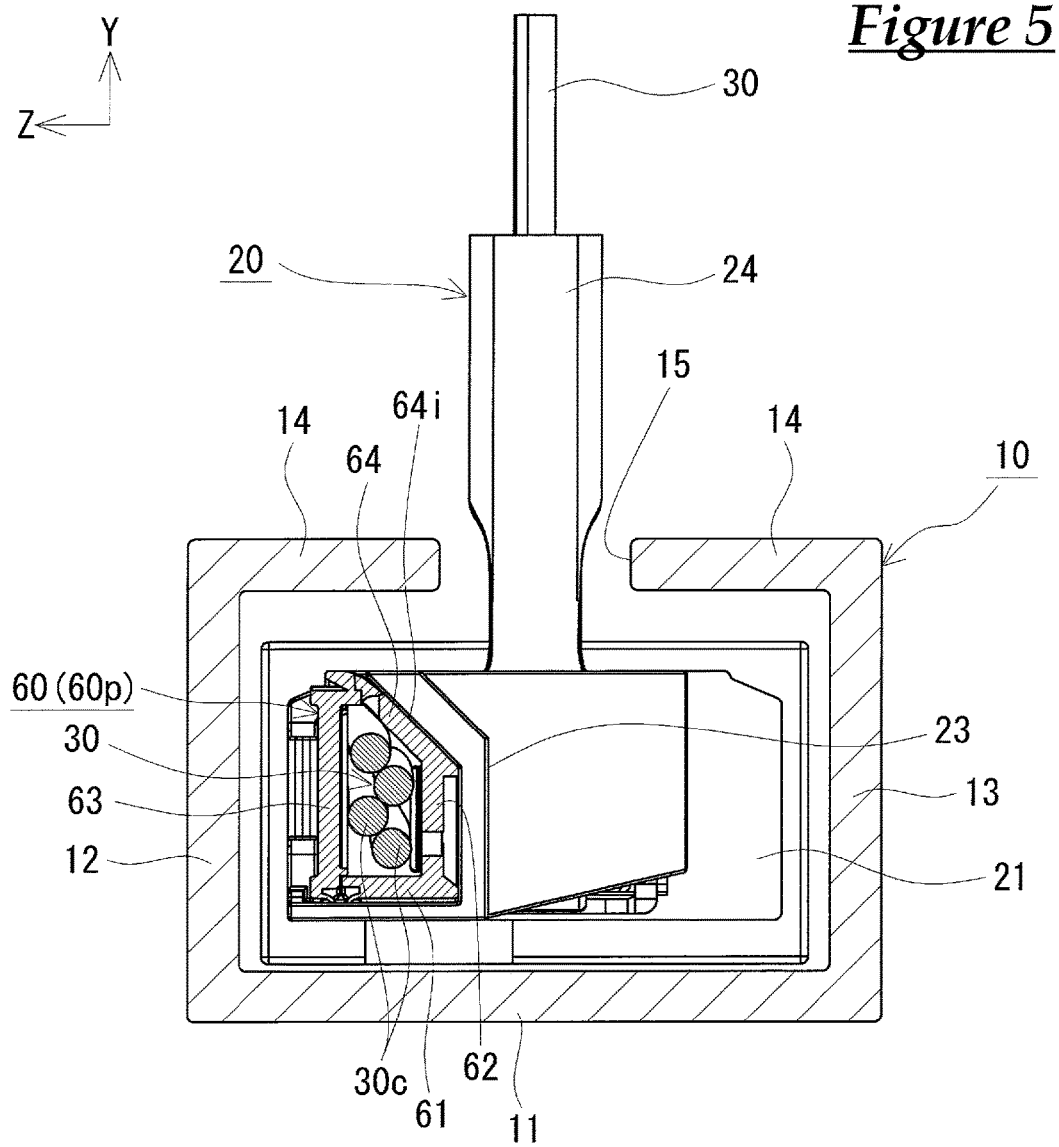
FIG. 5 is a schematic cross-sectional view viewed from line V-V in FIG. 3.

In this example, as shown in FIG. 5, the support rail 10 has a quadrangular tubular shape and has a bottom wall 11, a left wall 12, a right wall 13, and an upper wall 14, and a rectangular space is formed in the support rail 10. The bottom wall 11 of the support rail 10 is fixed to the floor of the vehicle body by bolts (not shown). The slit 15 passes through the upper wall 14 of the support rail 10. The support rail 10 is made of metal such as an aluminum alloy, steel, or stainless steel, for example.

The slider 20 is a member that is attached to the support rail 10 slidably in the longitudinal direction, and is configured to support the sliding seat S. As shown in FIGS. 2 to 4, the slider 20 includes a main body 21 that is fitted into the support rail 10, and a support portion 22 that protrudes upward from the main body 21 and is exposed from the slit 15. The support portion 22 is for supporting the sliding seat S shown in FIG. 1, and a base p of the sliding seat S is fixed to the support portion 22.

Also, as shown in FIGS. 3 and 4, the slider 20 has a linking portion 23 to which one end of the external member 60 that is wrapped around the wire harness 30, which will be described later, is linked. The linking portion 23 is attached to a front end surface of the slider 20. As shown in FIG. 5, this linking portion 23 is provided with an introduction portion 24 configured to introduce one end of the wire harness 30 that is drawn out from the external member 60 from the slit 15 of the support rail 10 toward the sliding seat.

The wire harness 30 is a member that is routed in the sliding seat S and is configured to electrically connect an electric component such as a battery or an ECU that is provided in a vehicle body and an electric component provided in the sliding seat S. The wire harness 30 has electric wires 30c such as power source wires or communication wires (see FIG. 5). The external member 60, which will be described later, is wrapped around the wire harness 30, and the wire harness 30 is accommodated in the external member 60.

As shown in FIG. 1, the wire harness 30 is disposed in a right support rail 10. As shown in FIG. 3, one end of the wire harness 30 passes through the support rail 10, is linked to the linking portion 23 of the slider 20, and is connected to the sliding seat S through the introduction portion 24 (also see FIG. 5). The other end of the wire harness 30 is drawn out from the opening portion 16 of the support rail 10 to the outside of the support rail 10.

In this example, as shown in FIG. 5, the wire harness 30 is arranged on the left (left wall 12 side) in the width direction of the support rail 10, with respect to the slit 15 in the internal space of the support rail 10.

As shown in FIGS. 2 and 3, the guide portion 40 is a member that is connected to the opening portion 16 of the support rail 10, and is configured to bend and fold an extra length portion 35 of the wire harness 30 that is drawn out from the opening portion 16 to the right of the support rail 10. As shown in FIGS. 3 and 4, the guide portion 40 has a bottom wall 41, an outer circumferential wall 42 and an inner circumferential wall 43 that extend from the bottom wall 41, and the guide portion 40 is provided with a guide path for bending the extra length portion 35 of the wire harness 30 and guiding the extra length portion 35 between the opening portion 16 of the support rail 10 and the accommodation portion 50. The outer circumferential wall 42 and the inner circumferential wall 43 are provided in parallel to each other at a predetermined interval such that the wire harness 30 (external member 60) can pass through the predetermined interval.

Also, the end portion of the guide portion 40 on the accommodation portion 50 side has the first guide wall 45 extending toward the accommodation portion 50, and the end portion on the support rail 10 side has the second guide wall 46 extending toward the opening portion 16 of the support rail 10. The first guide wall 45 and the second guide wall 46 are continuous with the outer circumferential wall 42. The first guide wall 45 and the second guide wall 46 will be described in detail later.

As shown in FIGS. 2 and 3, the accommodation portion 50 is a member that is disposed to the right of the support rail 10 and is connected to the guide portion 40, and for accommodating the extra length portion 35 of the wire harness 30 that has passed through the guide portion 40 in a state in which the extra length portion 35 is folded in a U-shape. The accommodation portion 50 is provided adjacent to the opening portion 16 of the support rail 10. As shown in FIGS. 3 and 4, the accommodation portion 50 has a bottom wall 51, an outer wall 52, an inner wall 53, and a rear end wall 54 that extend upward from the bottom wall 51, and is provided with an accommodation space for accommodating the extra length portion 35 that is folded in a U-shape. The outer wall 52 and the inner wall 53 are provided in parallel to each other with a predetermined interval such that they can accommodate the extra length portion 35 in a state in which the extra length portion 35 is folded in a U-shape. The outer wall 52 is located further away from the support rail 10, and the inner wall 53 is located nearer to the support rail 10. The rear end wall 54 is located opposite to the guide portion 40, and links rear ends of the outer wall 52 and the inner wall 53. The accommodation portion 50 is provided with an outlet 56 for drawing out the other end of the wire harness 30 to the outside.

A state in which the extra length portion 35 of the wire harness 30 is accommodated in the accommodation portion 50 will be described. The extra length portion 35 of the wire harness 30 has a linear portion 36 that linearly extends from the guide portion 40 toward the accommodation portion 50, a folded portion 37 that is folded opposite to the guide portion 40 side, and an inner linear portion 38 extending from the folded portion 37 toward the guide portion 40. The linear portion 36 of the wire harness 30 faces the outer wall 52 of the accommodation portion 50, and the inner linear portion 38 is disposed along the inner wall 53. Herein, the outer wall 52 of the accommodation portion 50 that faces the linear portion 36 is provided with a step portion 55 that forms a step with the first guide wall 45 of the guide portion 40, and the linear portion 36 is not in contact with the outer wall 52 due to this step portion 55. The step portion 55 will be described later in detail.

The guide portion 40 and the accommodation portion 50 are made of resin such as polyethylene terephthalate (PET), polypropylene (PP), or polyacetal (POM), for example. In this example, the guide portion 40 and the accommodation portion 50 are molded integrally.

As shown in FIG. 5, the external member 60 is wrapped around the wire harness 30, and is configured to protect the wire harness 30 and restrict the direction in which the wire harness 30 bends. As shown in FIG. 3, the external member 60 is bendable in only one direction, its one end is linked to the linking portion 23 of the slider 20, and is wrapped around the wire harness 30 from one end to the extra length portion 35 on the other end. The external member 60 is made of resin such as PET, PP, or POM, for example.

Figure 6:
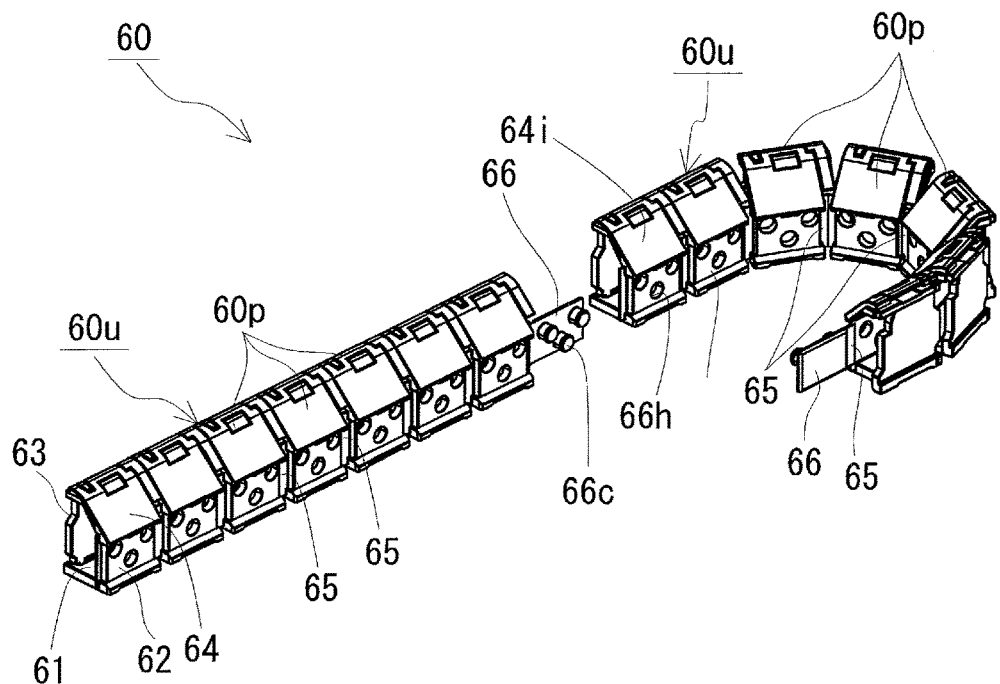
FIG. 6 is a schematic perspective view of an external member included in the slide wiring apparatus according to Embodiment 1.
Figure 7:
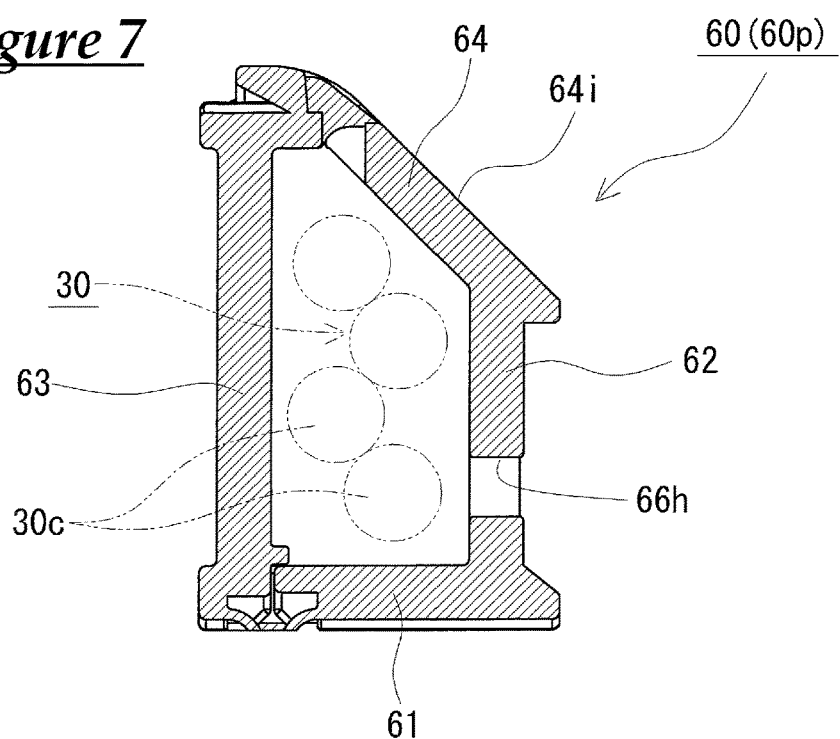
FIG. 7 is a schematic cross-sectional view of the external member included in the slide wiring apparatus according to Embodiment 1.

In this example, as shown in FIGS. 6 and 7, the external member 60 is constituted by linking a plurality of tubular pieces 60p that cover the wire harness 30 in series. Portions of adjacent tubular pieces 60p that are located on the radially inner side when the external member 60 is bent are joined by hinges 65. The external member 60 can also be constituted by joining and linking inner wall portions 62 of adjacent tubular pieces 60p by hinges 65, or by linking using a linking mechanism configured to be capable of bending adjacent tubular pieces 60p in only one direction. A commercially available cable protection member (for example, cableveyor (registered trademark) or the like) can also be utilized as the external member 60.

The tubular pieces 60p each have a quadrangular tubular shape (specifically, a right-angled trapezoidal tubular shape), and have a bottom wall portion 61, an inner wall portion 62, an outer wall portion 63, and an upper wall portion 64. As shown in FIG. 6, the inner wall portions 62 of adjacent tubular pieces 60p are joined by hinges 65, and the external member 60 can be bent toward the inner wall portion 62. The upper wall of the tubular pieces 60*p* is rectangular, and when the external member 60 is attempted to be bent toward the outer wall portions 63 located on the opposite side, end surfaces of adjacent tubular pieces 60*p* come into contact with each other, and thus the external member 60 cannot be bent toward the outer wall portions 63. That is, the external member 60 is bendable in only one direction. Also, as shown in FIG. 7, in the tubular pieces 60*p*, the height of the inner wall portion 62 is lower than that of the outer wall portion 63, the upper wall portion 64 is inclined from the outer wall portion 63 toward the inner wall portion 62, and the upper wall has an inclined surface 64*i*. As shown in FIG. 5, if the wire harness 30 is arranged on the left in the support rail 10, then the upper wall portion 64 of the external member 60 (tubular pieces 60*p*) is located on the slit 15 side, and thus the inclined surface 64*i* is downwardly inclined toward the center in the width direction of the support rail 10. The shape of the tubular pieces 60*p* is not limited to a quadrangular tubular shape, and may also be another polygonal tubular shape such as a triangular tubular shape.

The outer wall portion 63 of the tubular piece 60*p* is formed to snap-fit to the upper wall portion 64, and is openable and closable, and thus the wire harness 30 is easily accommodated in the external member 60.

Also, in this example, as shown in FIG. 6, the external member 60 is constituted by joining a plurality of tubular piece groups 60*u* where one group includes seven tubular pieces 60*p*. The inner wall portion 62 of the tubular piece 60*p* on one end of the tubular piece groups 60*u* is provided with the linking portion 66 via the hinge 65. The linking portion 66 has protrusions 66*c*, and the tubular piece 60*p* on the other end of the tubular piece groups 60*u* is provided with fitting holes 66*h* to which the protrusions 66*c* are fitted. The tubular piece groups 60*u* can be linked by fitting the protrusions 66*c* of the linking portion 66 provided in the tubular piece 60*p* on one end of the tubular piece group 60*u* to the fitting holes 66*h* formed in the tubular piece 60*p* on the other end of a different tubular piece group 60*u*.

As shown in FIG. 3, the first guide wall 45 of the guide portion 40 is in contact with the linear portion 36 of the extra length portion 35 of the wire harness 30, and when the wire harness 30 moves following the movement of the slider 20 (sliding seat S), the first guide wall 45 slides against the external member 60 of the wire harness 30. On the other hand, the outer wall 52 of the accommodation portion 50 that faces the linear portion 36 of the extra length portion 35 is provided with the step portion 55, and thus the outer wall 52 does not slide against the external member 60 of the wire harness 30. In this example, the first guide wall 45 is linearly provided approximately in parallel to the outer wall 52 of the accommodation portion 50.

As shown in FIG. 3, the second guide wall 46 of the guide portion 40 is in contact with the external member 60 of the wire harness 30 that is drawn out from the opening portion 16 of the support rail 10, and when the wire harness 30 moves following the movement of the slider 20, the second guide wall 46 slides against the external member 60. As shown in FIG. 4, the second guide wall 46 is located inward (on the center side) of the left wall 12 of the support rail 10 in the width direction of the support rail 10.

Effects

The slide wiring apparatus 1 according to Embodiment 1 exhibits the following effects.

The external member 60, which is bendable in only one direction, provides the linear portion 36 of the extra length portion 35 of the wire harness 30 with linearity, and the linear portion 36 is kept linear. Also, the end portion of the guide portion 40 on the accommodation portion 50 side is provided with the first guide wall 45, and the outer wall 52 of the accommodation portion 50 is provided with the step portion 55 that forms a step with the first guide wall 45. Accordingly, a clearance can be provided between the outer wall 52 and the external member 60 in the linear portion 36 of the extra length portion 35, and it is possible to prevent the external member 60 of the linear portion 36 from sliding against the outer wall 52 of the accommodation portion 50 over the full length. Thus, it is possible to reduce frictional resistance caused by the external member 60 in the linear portion 36 of the extra length portion 35 sliding against the outer wall 52 of the accommodation portion 50, reduce a slide operation load, and to suppress production of irritating noise during the slide movement.

Furthermore, providing the second guide wall 46 at the end portion of the guide portion 40 on the support rail 10 side makes it possible to provide a clearance between the left wall 12 of the support rail 10 and the external member 60 of the wire harness 30 in the support rail 10. Thus, it is possible to prevent the external member 60 of the wire harness 30 from sliding against the left wall 12 of the support rail 10. Thus, it is possible to reduce frictional resistance caused by the external member 60 in the wire harness 30 in the support rail 10 sliding against the left wall 12 of the support rail 10, to further reduce a slide operation load, and to further suppress production of irritating noise during the slide movement.

Figure 8:
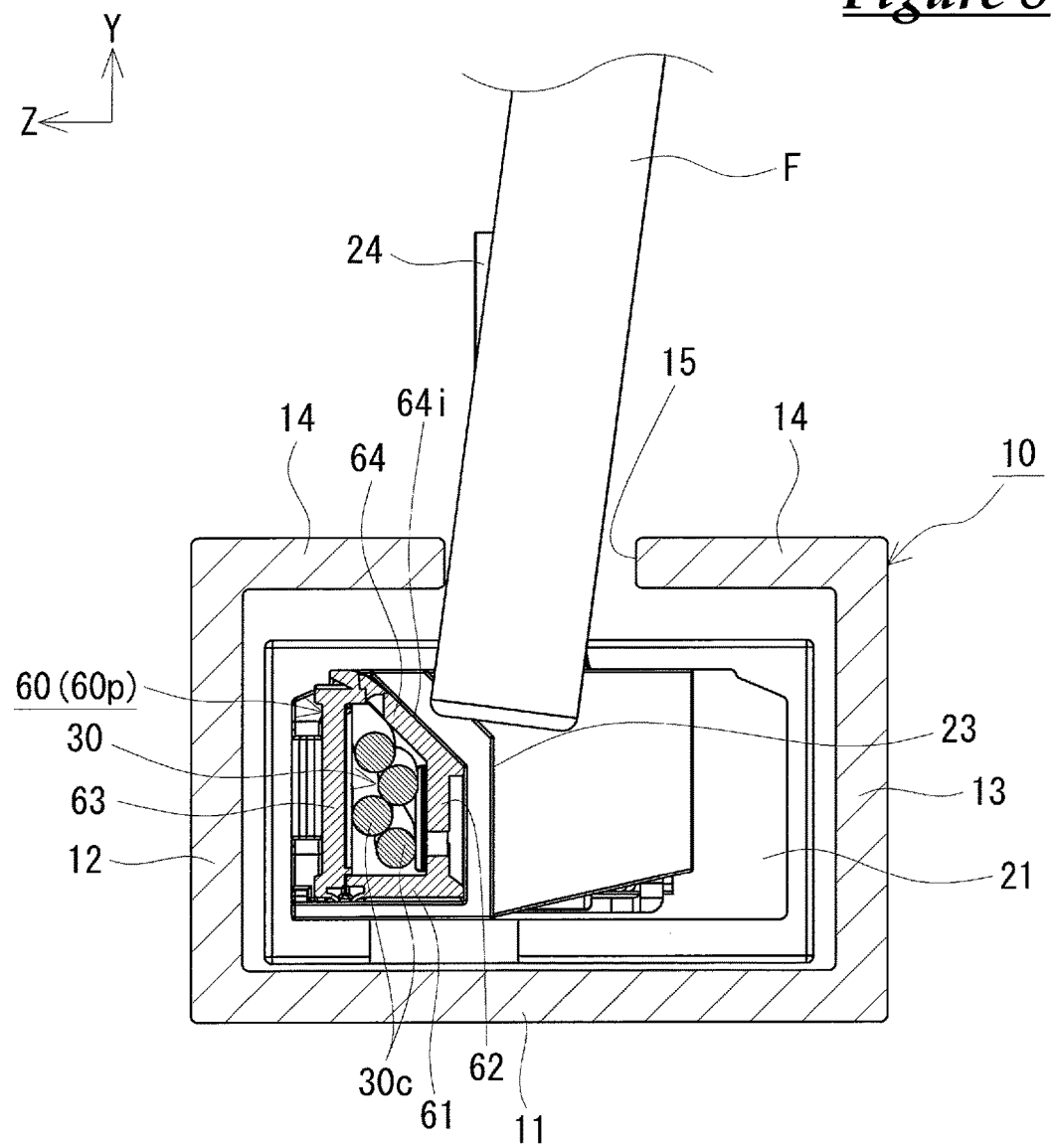
FIG. 8 is a schematic cross-sectional view showing a state in which foreign matter enters the slide wiring apparatus according to Embodiment 1.

Because the upper wall portion 64 of the external member 60 located on the slit 15 side has the inclined surface 64*i*, it is possible to avoid impairment of the external member 60 caused by entering of foreign matter. Because the support rail 10 is provided with the slit 15, as shown in FIG. 8, there is a possibility that hard rod-shaped foreign matter F such as an end of an umbrella will enter the support rail 10 from the slit 15. The orientation of the foreign matter F pressed against the upper wall portion 64 can be changed along the inclined surface 64*i* due to the inclined surface 64*i* of the upper wall portion 64 of the external member 60. Thus, the impairment of the external member 60 caused by the foreign matter F can be easily avoided. In addition, if a clearance is provided by the above-described second guide wall 46 between the external member 60 and the left wall 12 of the support rail 10, then this space can be utilized as a space for retracting the external member 60. Specifically, when the foreign matter F is pressed against the inclined surface 64*i* of the upper wall portion 64 of the external member 60, the external member 60 moves toward the left wall 12 of the support rail 10, and impairment of the external member 60 can be further avoided.

Modification 1

Although a case where the first guide wall 45 is provided approximately in parallel to the outer wall 52 of the accommodation portion 50 was described in Embodiment 1, the first guide wall 45 may also be inclined away from the outer wall 52 of the accommodation portion 50 from the guide portion 40 toward the accommodation portion 50. In this case, the external member 60 in the linear portion 36 of the extra length portion 35 of the wire harness 30 is even more unlikely to slide against the outer wall 52 of the accommodation portion 50. If the first guide wall 45 is inclined, an angle at which the first guide wall 45 is inclined may be set as appropriate such that a radius of curvature of the folded portion 37 of the extra length portion 35 is at least an allowable bending radius of the external member 60 (wire harness 30).

Applications of Slide Wiring Apparatus

A slide wiring apparatus according to an embodiment of the present disclosure can be utilized for a sliding seat provided in a vehicle.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Slide wiring apparatus
S Sliding seat (sliding member)
p Base
10 Support rail
11 Bottom wall
12 Left wall
13 Right wall
14 Upper wall
15 Slit
16 Opening portion
20 Slider
21 Main body
22 Support portion
23 Linking portion
24 Introduction portion
30 Wire harness
30c Electric wire
35 Extra length portion
36 Linear portion
37 Folded portion
38 Inner linear portion
40 Guide portion
41 Bottom wall
42 Outer circumferential wall
43 Inner circumferential wall
45 First guide wall
46 Second guide wall
50 Accommodation portion
51 Bottom wall
52 Outer wall
53 Inner wall
54 Rear end wall
55 Step portion
56 Outlet
60 External member
60p Tubular piece
60u Tubular piece group
61 Bottom wall portion
62 Inner wall portion
63 Outer wall portion
64 Upper wall portion
64i Inclined surface
65 Hinge
66 Linking portion
66c Protrusion
66h Fitting hole
F Foreign matter

The invention claimed is:

1. A slide wiring apparatus configured to electrically connect a vehicle body and a sliding member that is slidably provided in the vehicle body, the slide wiring apparatus comprising:
  a support rail that is fixed to the vehicle body and is provided with a slit extending in a longitudinal direction;
  a slider that is slidably attached to the support rail, is exposed from the slit, and is configured to support the sliding member;
  a wire harness that is disposed inside the support rail, has one end that is connected to the sliding member, and has another end that is drawn out of the support rail from an opening portion provided at one end of the support rail;
  a guide portion that is connected to the opening portion of the support rail, and is configured to bend and fold, toward the support rail, an extra length portion of the wire harness that is drawn out from the opening portion;
  an accommodation portion for accommodating the extra length portion of the wire harness passing through the guide portion in a state in which the extra length portion is folded in a U-shape, the accommodation portion being disposed on the side of the support rail and being connected to the guide portion; and
  an external member that has one end linked to the slider, is wrapped around the wire harness from its one end to the extra length portion at the other end, and is bendable in only one direction,
  wherein the extra length portion of the wire harness has a linear portion that linearly extends from the guide portion toward the accommodation portion, and a folded portion that is folded on the side opposite to the guide portion side,
  the end portion of the guide portion on the accommodation portion side has a first guide wall that extends toward the accommodation portion and slides against the external member of the wire harness,
  a side wall of the accommodation portion that faces the linear portion of the wire harness is provided with a step portion that forms a step with the first guide wall and does not slide against the external member of the wire harness,
  the end portion of the guide portion on the support rail side has a second guide wall that extends toward the opening portion of the support rail and slides against the external member of the wire harness, and
  the second guide wall is located inward of the side wall of the support rail in a width direction of the support rail.

2. The slide wiring apparatus according to claim 1, wherein the first guide wall is inclined away from the side wall of the accommodation portion from the guide portion toward the accommodation portion.

3. The slide wiring apparatus according to claim 1, wherein the external member is constituted by linking a plurality of tubular pieces that cover the wire harness in series, and portions of the adjacent tubular pieces that are located on a radially inner side when the external member is bent are joined by hinges.

4. A slide wiring apparatus configured to electrically connect a vehicle body and a sliding member that is slidably provided in the vehicle body, the slide wiring apparatus comprising:

a support rail that is fixed to the vehicle body and is provided with a slit extending in a longitudinal direction;

a slider that is slidably attached to the support rail, is exposed from the slit, and is configured to support the sliding member;

a wire harness that is disposed inside the support rail, has one end that is connected to the sliding member, and has another end that is drawn out of the support rail from an opening portion provided at one end of the support rail;

a guide portion that is connected to the opening portion of the support rail, and is configured to bend and fold, toward the support rail, an extra length portion of the wire harness that is drawn out from the opening portion;

an accommodation portion for accommodating the extra length portion of the wire harness passing through the guide portion in a state in which the extra length portion is folded in a U-shape, the accommodation portion being disposed on the side of the support rail and being connected to the guide portion; and an external member that has one end linked to the slider, is wrapped around the wire harness from its one end to the extra length portion at the other end, and is bendable in only one direction, wherein the extra length portion of the wire harness has a linear portion that linearly extends from the guide portion toward the accommodation portion, and a folded portion that is folded on the side opposite to the guide portion side, the end portion of the guide portion on the accommodation portion side has a first guide wall that extends toward the accommodation portion and slides against the external member of the wire harness, a side wall of the accommodation portion that faces the linear portion of the wire harness is provided with a step portion that forms a step with the first guide wall and does not slide against the external member of the wire harness, the wire harness is arranged on one side in a width direction of the support rail, with respect to the slit in the support rail, and an upper wall of the external member located on the slit side has an inclined surface that downwardly inclines toward a center in the width direction of the support rail.

* * * * *